United States Patent Office 3,235,540
Patented Feb. 15, 1966

3,235,540
METALLIZED AZAPORPHINE PYRAZOLONE MONOAZO DYESTUFFS
Heinz-Adolf Dortmann, Bergisch Gladbach, and Peter Schmitz, Cologne-Stammheim, Germany, assignors to Farbenfabriken Bayer Aktiengesellschaft, Leverkusen, Germany, a corporation of Germany
No Drawing. Filed Mar. 12, 1962, Ser. No. 179,243
Claims priority, application Germany, Mar. 16, 1961, F 33,430
12 Claims. (Cl. 260—147)

The present invention relates to novel metal containing azo dyestuffs; more particularly it concerns chromium and cobalt complexes of azo-azaporphin dyestuffs or the general formula

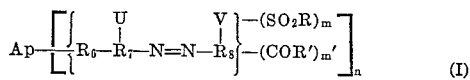  (I)

In this formula Ap denotes the radical of an azaporphin dyestuff, preferably of a phthalocyanine dyestuff, $R_6$ is a bridge member, $R_7$ means a radical of the benzene-, naphthalene-, pyrazole- or acylacetic acid amide series in which U is situated in o-position to the azo bridge, U is an OH or a primary or secondary amino group, $R_8$ denotes the radical of a diazo component, containing V linked in the o-position to the azo bridge, V is a metal complex-forming grouping, R means a group $-CH_2CH_2-OSO_3X$, $-NH-R_1-OSO_3X$, $-NH-R_2$-halogen or the grouping

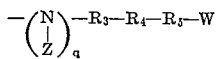

R' denotes a group

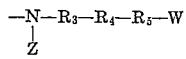

X is hydrogen or an alkali metal cation, $R_1$ and $R_2$ are alkylene radicals with 2 or 3 carbon atoms between $-N-$ and $-O-$ or "halogen," $R_3$ denotes an alkylene or cycloalkylene radical, $R_5$ is an alkylene radical with 2 or 3 carbon atoms between the radicals $-R_4-$ and $-W$, $R_4$ is an oxygen or sulphur atom or a group

Y and Z are hydrogen or aromatic, araliphatic, cycloaliphatic or aliphatic substituents which may be constituents of a hetero ring, W is a substituent to be split off as a negative ion, q is 0 or 1, m and m' are whole numbers, the sum of m and m' being at least 1, and n is a whole number.

The novel metal-containing azo dyestuffs are obtained by treating the dyestuffs of the Formula I wherein V may be a metal complex forming group or a grouping which under the conditions of metallization is transformed into a metal complex forming group (specified as V').

Metal free dyestuffs of the general Formula I, in which the bridge $R^6$ denotes a sulphonamide or carboxamide group, can, for example, be obtained by coupling diazo compounds, containing in the o-position to the diazo group a metal complex-forming group, with such azaporphin coupling components which have been obtained by reacting phthalocyanine sulphonic acid- or carboxylic acid chlorides with such primary or secondary coupling amines of the benzene-, naphthalene-, pyrazole- or acylacetic acid amide series which contain adjacent to the coupling position a hydroxyl group or a primary or secondary amino group, choosing the starting components in such a way that they possess together at least one grouping of the formula

  (II)

In the production of the coupling azaporphine compounds metal-free as well as metal-containing azaporphin derivatives, for example copper-, cobalt-, nickel-, iron-, chrominum-, aluminium- or zinc-containing phthalocyanines can be applied.

When using azaporphin dyestuffs containing sulphonic acid chloride or carboxylic acid chloride groups the acid chloride groups can be situated in the benzene nuclei of the macrocyclic ring or also in annellated rings or in aryl radicals which are linked to the phthalocyanine radical either directly or via bridge atoms, such as $-CO-$, $SO_2-$, or $-NH-$. According to the number of sulphonic acid or carboxylic acid chloride groups present in the phthalocyanine radical the number of the sulphonic acid amide groups formed generally varies between 1 and 8. Besides, the phthalocyanine radical may also contain other substituents, such as halogen, alkyl, alkoxy or sulphonic acid groups, acylamino groups, etc.

Suitable amines to be reacted with the phthalocyanine sulphonic acid or -carboxylic acid chlorides in the above mentioned process for the production of coupling phthalocyanine acid amides are primary and secondary aromatic amines of the benzene-, naphthalene-, pyrazole-, for example of the 5-amino pyrazole or 5-pyrazolone series, and of the acylacetic acid amide series, which possess at least one coupling position in the molecule and contain in the o-position to the coupling position a metal complex-forming grouping, for example amino naphthols, amino napthol carboxylic acid amides, amino aryl pyrazolones, 1-(amino aryl)-5-amino pyrazoles, amino aroyl acetic acid amides and acetylacetic acid amino aryl amides.

The connection of the radicals of the benzene-, naphthalene, pyrazole or acylacetic acid amide series ($R_7$) with the molecule of the azaporphin dyestuff can generally be carried out through any desired bridge members. Besides the sulphonamide and carboxamide groups mentioned above, especially sulphonyl amino, carbonyl amino, methylene amino and urea groupings can be taken into consideration. Dyestuffs containing the last-mentioned bridge members can, for example, be built up by reacting for example chloromethyl compounds of phthalocyanines with such primary or secondary coupling amines of the benzene-, naphthalene-, pyrazole or acylacetic acid amide series which carry a hydroxyl group or the corresponding O-aryl-sulphonic acid ester adjacent to a carbon atom capable of being coupled with a diazonium compound.

In the case of the O-aryl-sulphonic acid ester the ester group is split after the reaction by known methods.

Urea groupings ($R_6$) can, for example, be introduced by phosgenating amino phthalocyanines or amino methyl phthalocyanines together with such primary or secondary coupling amines of the benzene, naphthalene, pyrazole- or acylacetic acid amide series which carry adjacent to the coupling position a hydroxyl group or the corresponding O-aryl-sulphonic acid ester group. Here, too, the O-aryl-sulphonic acid ester group is split after the reaction in known manner to form the free OH-compound. In a similar manner amino phthalocyanines or amino methyl phthalocyanines can be reacted with chloroformic acid aryl ester and the reaction products can then be reacted with such primary or secondary coupling amines of the benzene-, naphthalene-, pyrazole- or acylacetic acid amide series which carry adjacent to the coupling position a hydroxyl group or an O-aryl-sulphonic acid ester group. Similarly, in the reversed reaction sequence, amino phthalocyanines or amino methyl phthalocyanines can be reacted with the reaction products of chloroformic acid aryl esters and suitable primary or secondary coupling amines of the benzene-, naphthalene-, pyrazole- or acylacetic acid amide series.

Sulphonyl amino or carbonyl amino groupings ($R_6$) can for example be introduced by condensing compounds carrying —COCl or —$SO_2Cl$ groups, for example 1-phenyl-(4'-sulphonic acid chloride)-3-methyl-5-pyrazolone-O-benzene sulphonic acid ester, with amino or amino methyl phthalocyanines and splitting the ester group after the reaction is completed.

The starting components may contain, besides one or several of the above mentioned groupings, substituents usual in azo dyestuffs, such as halogen, nitro, alkyl, azo, alkoxy, cyano, optionally substituted sulphonamide, sulphone or carboxamide groups, free sulphonic acid and carboxylic acid groups and the like.

Instead of using starting components containing the groupings (II), according to a modification of the production process, these groups can be incorporated subsequently into the metal-free or metal-containing azo dyestuffs. For this purpose diazo and/or coupling components containing sulphonic acid groups are used, in which the sulphonic acid groups are transformed, after coupling, by the action of, for example, chlorosulphonic acid and thionyl chloride, into the corresponding sulphochloride groups, and these are in turn subsequently transformed, for example, with amines of the formula $$H_2N—R_1—OSO_3X$$

into the corresponding sulphonamides.

A further possibility is given by first reacting starting components containing sulphochloride groups or azo dyestuffs of the above mentioned type with hydroxyalkyl amines, containing a chain of 2 or 3 carbon atoms between the hydroxy and the amino groups, or, when using starting components containing sulphonic acid hydroxyethylamide groups, by first carrying out the coupling and transforming the hydroxyalkylamide groups in the azo dyestuffs, before or after metallisation, into the sulphuric acid semi-esters by customary methods, for example with sulphuric acid or chlorosulphonic acid/pyridine, $SO_3$/pyridine.

When using starting components free of sulphonic acid groups the grouping —$SO_2$—NH—$R_1$—$OSO_3X$ can, for example, be incorporated in the azo dyestuff after coupling by treating the dyestuff with a sulphochlorinating agent, such as chlorosulphonic acid and thionyl chloride, whereby one or several sulphochloride groups are introduced, and subsequently transforming these into the esterified hydroxyalkyl sulphonamide groups. During sulphochlorination of the pre-formed azo dyestuffs sulphochloride groups are incorporated, according to the substitution, into the diazo and/or coupling component. These can afterwards be partially saponified or completely transformed into the hydroxyalkyl sulphonamide-sulphuric acid semi-ester grouping.

Diazo components suitable for the production of the new dyestuffs and containing in the o-position to the diazo group a metal complex-forming grouping are inter alia:

2 - amino-1-hydrobenzene-4- or -5-sulphonyl-aminoethyl-hydrogen sulphate, 2-amino-1-hydroxy-6-chlorobenzene-4-sulphonyl-aminoethyl-hydrogen sulphate of the formula

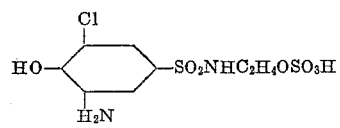

2-amino-1-hydroxy-4-chlorobenzene-6- or -5-sulphonyl-aminoethyl-hydrogen sulphate, 2-amino-1-hydroxy-4-nitrobenzene-6-sulphonyl-aminoethyl-hydrogen sulphate, 2-amino-1-hydroxy-6-nitrobenzene-4-sulphonyl-aminoethyl-hydrogen sulphate, 2-amino-1-carboxybenzene-4-sulphonyl-aminoethyl-hydrogen sulphate, 2-amino-1-hydroxybenzene-4,6-bis-(sulphonyl-aminoethyl-hydrogen sulphate), 1-amino-2-hydroxy-naphthalene-4-(sulphonyl-aminoethyl-hydrogen sulphate), 2-amino-1-hydroxynaphthalene-4-sulphonyl-aminoethyl-hydrogen sulphate or the corresponding sulphonic acid hydroxyethylamides. According to the invention, the sulphonyl-aminoethyl-hydrogen sulphate groupings can be replaced in the above mentioned compounds by radicals, as defined by the general formula described in the beginning, for example:

—$SO_2$—$CH_2CH_2$—$OSO_3Na$,  —$SO_2NH$—$CH_2CH_2$—$Cl$,

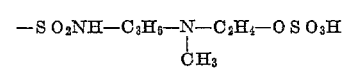

etc.

Coupling components suitable for the process are for example:

The condensation product of 1 mol nickel-phthalocyanine-(3)- or -(4)-tetrasulphochloride and 4 mols 1-(4'-aminophenyl)- or 1-(3'-aminophenyl)-3-methyl-5-pyrazolone, The condensation product of 1 mol nickel-phthalocyanine-(3)- or -(4)-tetrasulphochloride and 2 mols 1-(4'-aminophenyl)- or 1-(3'-aminophenyl)-3-methyl-5-pyrazolone, The condensation product of 1 mol nickel-phthalocyanine-(3)- or -(4)- tri- or disulphochloride and 3 or 2 mols 1-(4'-aminophenyl)- or 1-(3'-aminophenyl)-3-methyl-5-pyrazolone, The condensation product of 1 mol nickel-phthalocyanine-(3)- or -(4)-tetrasulphochloride and 4 mols 2-hydroxynaphthalene - 3 - carboxylic acid-(3'-aminophenyl)- or -(4'-aminophenyl)-amide, The condensation product of 1 mol nickel-phthalocyanine-(3)- or -(4)-tri- or disulphochloride and 3 or 2 mols 2 - hydroxynaphthalene - 3 - carboxylic acid-(3'-aminophenyl)- or -(4'-aminophenyl)-amide.

The condensation product of 1 mol nickel-phthalocyanine-(3)- or -(4)-tetra- or tri- or disulphochloride and 4 or 3 or 2 mols 1-amino-7-hydroxynaphthalene, The condensation product of 1 mol nickel-phthalocyanine-(3)- or -(4)-tetra- or tri- or disulphochloride and 4 or 3 or 2 mols (3'-amino)-acetoacetic acid anilide, The condensation product of 1 mol nickel-phthalocyanine-(3)- or -(4)-tetra- or tri- or disulphochloride and 4 or 3 or 2 mols 4-aminophenol.

In the same manner, the corresponding derivatives of, for example, copper or cobalt phthalocyanine can be used.

The substituent V in the diazo component need not necessarily be a metal complex-forming grouping, such as —OH, COOH and the like, but in its place there can also be a substituent, such as Cl, alkoxy, or $SO_3H$ or a hydrogen atom which, according to known methods, is transformed under the conditions of metallisation into metal complex-forming groupings. In such cases it is generally recommended to carry out the esterification of the alkoxysulphonamide groups at the end of the process, i.e. in the azo dyestuffs, because the sulphuric acid semi-ester groups are easily split under the more strongly alkaline conditions of metallisation which are necessary if an OH group has to be formed during metallisation from e.g. Cl. As diazo components substituted with o-chloro or o-alkoxy groups which can be metallised by chlorine exchange or by splitting of the alkoxy group the following compounds can be used for example: 1-amino-2-alkoxy - 4 - methylbenzene-5-sulphonic acid hydroxy ethylamide, 1 - amino - 2-chloro-6-methylbenzene-4-sulphonic acid hydroxy ethylamide, 1-amino-2-chloro- or -2-methoxy - 4 - or - 5 - sulphonic acid hydroxy ethylamide, and others. By chlorine exchange the copper complex compounds are initially formed which can be de-coppered and subsequently be cobalted or chromed.

If in the diazo component the substituent situated in the o-position to the azo-bridge, which is transformable into a metal complex-forming group, is a hydrogen atom or a sulphonic acid group, the new dyestuffs can here likewise be obtained via the copper complex compounds of the o,o'-dihydroxy-azo dyestuffs which can be produced by de-sulphonating or oxidative coppering, according to the processes of German patent specifications Nos. 807,289; 889,196; 893,699 or 1,006,098. Oxidative coppering is, because of the milder reaction conditions, also applicable if the starting components contain initially an hydroxyalkyl sulphonamide group esterified with sulphuric acid, of the type characterised before. The copper complex dyestuffs can be de-coppered by dissolving them in sulphuric acid or by treating them with sodium sulphide or hydrogen sulphide, and the o,o'-dihydroxy-azo dyestuffs thus obtained can subsequently be cobalted or chromed. When de-coppering dyestuffs containing sulphonic acid hydroxy ethylamide groups in sulphuric acid, esterification of the aliphatic hydroxyl groups simultaneously takes place.

Diazo components in which the substituent transformable into a metal complex-forming group is represented by a hydrogen atom are inter alia:

1-amino-3-nitrobenzene-4-sulphonyl-aminoethyl - hydrogen sulphate
1-amino-2-nitrobenzene-4-sulphonyl-aminoethyl - hydrogen sulphate
1-amino-2-methylbenzene-4-sulphonyl - aminoethyl - hydrogen sulphate
1-amino-4-methylbenzene-3-sulphonyl - aminoethyl - hydrogen sulphate
1-aminobenzene-2-sulphonyl-aminoethyl - hydrogen sulphate
1-aminobenzene-3-sulphonyl-aminoethyl - hydrogen sulphate
1-aminobenzene-4- sulphonyl-aminoethyl - hydrogen sulphate
1-aminonaphthalene-4-sulphonyl - aminoethyl - hydrogen sulphate
2-aminonaphthalene-4,8-bis-(sulphonyl - aminoethyl - hydrogen sulphate)
1-aminonaphthalene-5,7-bis-(sulphonyl - aminoethyl - hydrogen sulphate)

or the non-esterfied sulphonic acid hydroxy ethylamides from which the sulphonyl-aminoethyl-hydrogen sulphates are derived.

In case of the subsequent esterification of hydroxyalkyl sulphonamide groups or the subsequent reaction of sulphochloride groups with sulphuric acid semi-esters of hydroxyalkyl amines, the sulphonic acids or hydroxyalkyl sulphonamides on which the above mentioned starting components are based can be used.

Apart from the esterified hydroxyalkyl sulphonamide groups the diazo—or coupling components or their residues in the final dyestuffs can also contain free sulphonic or carboxylic acid groups. In the subsequent metallisation of the dyestuffs free carboxylic acids, in case they are situated in the o-position to the diazo group, can be incorporated in the metal complex linkage.

If the free sulphonic or carboxylic acid groups are to be preserved in the final dyestuffs, which means that they are not transformed according to one of the above mentioned processes via the acid chlorides into the esterified hydroxyalkyl-sulphonamide or carboxamide groups, it is advisable to introduce one of the two starting components with one or several free sulphonic or carboxylic acid groups, and the other component with one or several alkoxy sulphonamide groups or esterified alkoxy sulphonamide groups. Such dyestuffs are, for example, obtained by combining diazo compounds containing sulphonic or carboxylic acid groups with coupling components containing sulphonic acid hydroxyethylamide groups of the above mentioned classes, or by coupling diazo compounds containing sulphonic acid amido-ethylhydrogen sulphate ($—SO_2NHCH_2CH_2OSO_3X$), groups with coupling components containing sulphonic or carboxylic acid groups of the benzene, pyrazole or acylacetic acid amide series of phthalocyanine acids. Furthermore, azo dyestuff-sulphochlorides can be reacted, for example with aminoethyl sulphate or amino ethanol, while partial saponification into sulphonic acids takes place.

Chroming and cobalting of the dyestuffs is carried out by methods known as such. Suitable methods are, inter alia, the action of chromium formate, chromium salicylic acids or bichromates in the presence of reducing agents, such as glucose. For the production of complex cobalt compounds ammoniacal cobalt salt solutions are suitable; the alkaline dyestuff solutions can also be reacted with cobalt salt solutions or with cobalt hydroxide. The dyestuffs can be metallised by themselves or mixed with any desired other metallisable dyestuffs, especially o,o'-dihydroxy-, o-hydroxy-o'-carboxy-, o-hydroxy-o'-amino- or o-carboxy-o'-amino-mono- and -polyazo dyestuffs.

The new metal-containing dyestuffs are suitable for dyeing various fibre materials, such as wool, silk, polyamide fibres, cotton, regenerated cellulose, etc. On these materials dyeings or prints outstandingly fast to washing and boiling are obtained, by applying the dyestuffs to the dyeing material and subjecting the dyeing material to the action of acid binding agents, preferably at a raised temperature.

For the dyeing of materials containing hydroxyl groups or of polyamide materials the dyestuffs are preferably applied in an aqueous solution to which can be added substances of alkaline reaction such as alkali metal hydroxide or alkali metal carbonate, or substances which are transformable into compounds of alkaline reaction such as alkali metal bicarbonate. Further auxiliaries can be added to the solution, which however, should not react with the dyestuffs in an undesirable manner. Such additions are, for example, surface-active substances, such as alkyl sulphates, or substances or dyeing auxiliaries preventing the migration of the dyestuff, such as urea (for improving the solubility or fixation of the dyestuff), or inert thickening agents, such as oil-in-water emulsions, tragacanth, starch, alginate or methyl cellulose.

The solutions or pastes thus obtained are applied to the dyeing material, for example by padding on the foulard or by printing, and subsequently heated to a higher temperature, preferably 40–150° C. for some time. Heating can be carried out in the hot flue, in a steamer, on hot rolls or by introducing into hot concentrated salt baths, either each by itself or one after the other, in any desired order.

When using a padding or dyeing bath without alkali a passage of the dry goods through a solution of alkaline reaction to which has been added sodium chloride or sodium sulphate, must follow. The addition of salt prevents, in this case, the migration of the dyestuff from the fibre.

When fixation is completed the dyeing goods are rinsed hot, and, if required by the intended usage of the dyed material, subsequently soaped, which removes dyestuff residues not sufficiently fixed. Dyeings of excellent fastness to wet processing are obtained.

For printing material containing hydroxyl groups or polyamide groups a paste of the dyestuff solution, a thickening agent, such as sodium alginate and a compound of alkaline reaction or a compound splitting off alkali when heated, such as sodium carbonate, potassium carbonate or sodium bicarbonate, is used, and the printed material is rinsed and, if desired, finally soaped.

Wool, silk and the like are preferably dyed from a neutral to acid bath. On these materials, too, dyeings with very good fastness properties are obtained.

The following examples are given for the purpose of illustrating the invention:

*Example 1*

1.45 mols 6-chloro-2-aminophenol-4-sulphonyl-aminoethyl hydrogensulphate are dissolved in 4 litres of ice/water (1:1) and .315 litre of concentrated hydrochloric acid and diazotized with 0.35 litre of a 30% sodium nitrite solution at 0–5° C. 0.72 mol of the condensation product of 1 mol nickel-phthalocyanine (Ni-Pc)-3-disulphochloride and 2 mols 1-(4'-aminophenyl)-3-methyl-pyrazolone-5 are dissolved in 20 litres of water, 0.09 litre of concentrated sodium hydroxide solution and 0.35 kg. of sodium carbonate, and after introducing 10 kg. of ice, the diazotization solution is added. By simultaneously adding dropwise 0.2 litre of concentrated sodium hydroxide solution a pH-value of 10 is maintained. A clear dark green solution is formed. The diazo dyestuff is salted out with 3 kg. of sodium chloride and the mixture adjusted to pH 5 (without filtration) with 0.5 litre of acetic acid. To this is added a solution of 0.24 kg. of crystalline cobalt sulphate (.7 $H_2O$) in 1.2 litres of hot water, the mixture is heated to 50–60° C. for 3 hours, and the olive-green 1:2 cobalt complex is filtered off with suction. The dyestuff is dried in a vacuum at 50–60° C.

*Example 2*

0.3 g. of the dyestuff obtained according to Example 1 is dissolved in 10 ml. of an aqueous solution containing 25 ml. of concentrated sodium hydroxide solution, 100 g. of urea and 5 g. of Turkey red oil per litre and it is applied to cotton calico. The material is dried for about 10 minutes at 120–140° C. or steamed, after intermediate drying at 60–80° C., for 8 minutes at 103–105° C. and then soaped while boiling. An olive-green coloration is obtained with very good fastness to light, boiling and solvents.

*Example 3*

40 g. of a dyestuff prepared according to Example 1 are dissolved with 100 g. of urea, 40 g. of sodium hydroxide solution (38° Bé.) and 320 ml. of water, and the mixture is stirred into 500 g. of a customary alginate thickening. Such a printing paste is applied according to known methods to cotton calico or spun rayon, the goods are dried intermediately at 60–80° C. and then steamed in dry steam at 103–105° C. for 8 minutes. After soaping, olive-green prints fast to boiling and solvents are obtained.

*Example 4*

1.55 mols 6-chloro-2-aminophenol-4-sulphonyl-aminoethyl hydrogensulphate are dissolved in 4 litres of ice/water (1:1) and 0.315 litre of concentrated hydrochloric acid and diazotized with 0.374 litre of a 30% sodium nitrite solution at 0–5° C. 0.5 mol of the condensation product of 1 mol Ni-Pc-3-trisulphochloride and 3 mols 1-(4'-aminophenyl)-3-methyl-pyrazolone-5 are dissolved in 15 litres of water, 0.095 litre of concentrated sodium hydroxide solution and 0.365 kg. of sodium carbonate and after introducing 10 kg. of ice the above diazotization solution is added. By simultaneously adding dropwise 0.21 litre of concentrated sodium hydroxide solution a pH-value of about 10 is maintained. A clear dark green solution is obtained. The trisazo dyestuff is quantitatively salted out with sodium chloride and the mixture adjusted to pH 5 with about 0.5 litre of acetic acid. Now a solution of 0.25 kg. of crystalline cobalt sulphate (.7 $H_2O$) in 1.2 litres of hot water is added, the mixture is heated to 50–60° C. for 3 hours and the olive-green 1:2 cobalt complex is filtered off with suction. The dyeings and prints obtained with it are more yellowish than those obtained with the 1:2 cobalt complex of Example 1. The dyestuff is dried in a vacuum at 50–60° C.

*Example 5*

0.525 mol 6-chloro-2-aminophenol-4-sulphonyl-aminoethyl hydrogensulphate are dissolved in 1.34 litres of ice/water (1:1) and 0.13 litre of concentrated hydrochloric acid and diazotized with 0.128 litre of a 30% sodium nitrite solution at 0–5° C. 0.125 mol of the condensation product of 1 mol Ni-Pc-3-tetrasulphochloride and 4 mols 1-(4'-aminophenyl)-3-methyl-pyrazolone-5 are dissolved in 2.5 litres of water, 2.5 kg. of ice, 0.03 litre of concentrated sodium hydroxide solution and 0.05 kg. of sodium carbonate and the above diazotization solution is added. By simultaneously adding dropwise 0.06 litre of concentrated sodium hydroxide solution a pH of 10 is maintained. A clear dark green solution is obtained. The solution is adjusted to pH 5 with 0.085 litre of glacial acetic acid. To this is added a solution of 0.0925 kg. of crystalline cobalt sulphate (.7 $H_2O$) dissolved in 0.45 litre of hot water, and the mixture is kept at 50–60° C. for 1–2 hours. The free acetic acid is buffered with 45 ml. of concentrated sodium hydroxide solution, the 1:2-cobalt complex is salted out with 1 kg. of sodium chloride and pressed off. The dyestuff can be applied according to the instructions of Examples 2 or 3 to cotton or regenerated cellulose. Dyeings and prints fast to washing are obtained, which, compared to those obtained with the dyestuffs of Example 1, show a more yellowish shade.

*Example 6*

By using in Examples 1 and 5 are diazo components 2-aminophenol-4-sulphonyl-aminoethyl hydrogensulphate, 2-aminophenol-5-sulphonyl-aminoethyl hydrogensulphate, 6-methyl-2-aminophenol-4,6-bis-(sulphonyl - aminoethyl hydrogensulphate), 4-chloro-2-aminophenol-6-sulphonyl - aminoethyl hydrogensulphate, 4-chloro-2-aminophenol-5-sulphonyl-aminoethyl hydrogensulphate, or 4-methyl-2-aminophenol-5- or -6-sulphonyl-aminoethyl hydrogensulphate, cobalt complex dyestuffs of similar dyeing properties are obtained.

*Example 7*

If in the Examples 1 and 5 the following coupling components are used dyestuffs are obtained after cobalting which can be applied in the manner given in Examples 2 and 3 to cotton or spun rayon and yield dyeings or prints of similar shades and similar valuable properties.

Condensation products of:

1 mol copper phthalocyanine-(Cu-Pc)-3-disulphochloride and 2 mols 1-(4'-aminophenyl-3-methyl-pyrazolone-5)

1 mol Cu-Pc-3-disulphochloride and 2 mols 1-(3'-aminophenyl-3-methyl-pyrazolone-5)

1 mol Cu-Pc-3-trisulphochloride and 3 mols 1-(4'-aminophenyl-3-methyl-pyrazolone-5)

1 mol Cu-Pc-3-trisulphochloride and 3 mols 1-(3'-aminophenyl-3-methyl-pyrazolone-5)

1 mol Cu-Pc-3-tetrasulphochloride and 4 mols 1-(3'-aminophenyl-3-methyl-pyrazolone-5)
1 mol Cu-Pc-3-tetrasulphochloride and 4 mols 1-(3'-aminophenyl-3-methyl-pyrazolone-5)
1 mol Cu-Pc-4-tetrasulphochloride and 4 mols 1-(4'-aminophenyl-3-methyl-pyrazolone-5)
1 mol Cu-Pc-4-tetrasulphochloride and 4 mols 1-(3'-aminophenyl-3-methyl-pyrazolone-5)
1 mol Ni-Pc-4-tetrasulphochloride and 4 mols 1-(4'-aminophenyl-3-methyl-pyrazolone-5)
1 mol Ni-Pc-4-tetrasulphochloride and 4 mols 1-(3'-aminophenyl-3-methyl-pyrazolone-5)
1 mol Ni-Pc-5-tetrasulphochloride and 2 mols 1-(4'-amino-phenyl-3-methyl-pyrazolone-5)
1 mol Ni-Pc-4-tetrasulphochloride and 2 mols 1-(3'-amino-phenyl-3-methyl-pyrazolone-5)
1 mol Ni-Pc-3-tetrasulphochloride and 2 mols 1-(4'-amino-phenyl-3-methyl-pyrazolone-5)
1 mol Ni-Pc-3-tetrasulphochloride and 2 mols 1-(3'-amino-phenyl-3-methyl-pyrazolone-5)
1 mol Ni-Pc-3-tetrasulphochloride and 2 mols 1-(4'-amino-phenyl-3-methyl-pyrazolone-5) as well as 2 mols aniline
1 mol Ni-Pc-3-tetrasulphochloride and 2 mols 1-(3'-amino-phenyl-3-methyl-pyrazolone-5) as well as 2 mols aniline.

*Example 8*

(a) 1.45 mols of 6-chloro-2-aminophenol-4-sulphonic acid-($\beta$-hydroxyethylamide) are introduced into a solution of 300 ml. of concentrated hydrochloric acid in 2.5 kg. of ice and 1500 ml. of water and diazotized with 333 ml. of a 30% sodium nitrite solution. 0.72 mols of the condensation product of 1 mol. Ni-Pc-3-disulphochloride and 2 mols 1-(4'-aminophenyl)-3-methyl-pyrazolone-5 are dissolved in 20 litres of water, 0.09 litre of concentrated sodium hydroxide solution and 0.35 kg. of soda and, after adding 10 kg. ice, the diazo solution prepared above is introduced. By simultaneously adding dropwise 0.2 litre of concentrated sodium hydroxide solution a pH-value of 10–12 is maintained. The green disazo dyestuff formed is filtered off with suction at pH 9 after first buffering with dilute hydrochloric acid or sodium bicarbonate.

(b) The moist disazo dyestuff prepared according to Example 8(a) is dissolved in 20 litres of water with 116 g. of sodium hydroxide at 90–95° C. and mixed within 10 minutes with a solution of 116 g. potassium bichromate and 218 g. of glucose in 1450 ml. of water. After further stirring at 90–95° C. for 40 minutes, the mixture is adjusted to pH 5 with acetic acid and the bluish olive-green 1:2 chromium complex is filtered off with suction. The dyestuff is washed with water and dried at 65–70° C.

(c) 300 ml. of chlorosulphonic acid are added dropwise to 1800 ml. pyridine at 15–25° C. The 1:2 chromium complex prepared according to Example 8(b) is added to the mixture at room temperature and the mixture is stirred until it completely dissolves. The mixture is then poured into ice, adjusted to pH 6 by adding solid sodium bicarbonate, the pyridine is distilled off in a vacuum and the dyestuff ester is filtered off with suction.

The procedure can also be carried out by pouring the reaction mixture onto ice, adding sodium chloride, pressing off the dyestuff ester, washing it free of pyridine with a salt solution and drying the dyestuff in a vacuum at 50° C. If such a dyestuff is applied to cotton or spun rayon according to the instructions of Examples 2 or 3, blue-green dyeings or prints are obtained with very good fastness to light, boiling and boiling with sodium carbonate.

*Example 9*

1/14 mol. of a disazo dyestuff prepared according to Example 8(a) is dissolved in 2000 ml. of water by means of soda-alkali, and at 80° C. a solution of 20.4 g. of crystallised cobalt sulphate (.7 $H_2O$) in 360 ml. of water and 254 ml. of 25% ammonia, which has been oxidised with 40 ml. of 3.5% hydrogen peroxide, is added. The mixture is after-stirred at 80° C. for one hour and the 1:2 cobalt complex is filtered off with suction, after the addition of salt. The dyestuff can be esterified after drying as described in Example 8(c) with chlorosulphonic acid/pyridine. When applied to cotton and regenerated cellulose the esterified dyestuff yields bluish olive-green dyeings and prints fast to washing.

*Example 10*

1.45 mols of diazotized 2-aminophenol-4-sulphonic acid-($\beta$-hydroxyethylamide) are added at 0–5° C. to a solution of 0.35 mol of the condensation product of 1 mol Ni-Pc-3-tetrasulphochloride and 4 mols 1-(4'-aminophenyl)-3-methyl-pyrazolone-5 in 7.5 litres of water, 7.5 kg. of ice, 0.09 litre of concentrated sodium hydroxide solution and 0.15 kg. of sodium carbonate. A pH of 10–11.5 is maintained by adding a sodium hydroxide solution dropwise. After coupling is completed the mixture is buffered to a pH of 9 and the dyestuff is filtered off with suction after the addition of salt.

The tetrakis-azo dyestuff prepared in this manner can be chromed according to Example 8(b) and can be esterified with chlorosulphonic acid/pyridine according to Example 8(c). On cotton the final dyestuff yields bluish green dyeings, fast to boiling and solvents.

*Example 11*

By using in Examples 8–10 as diazo components 2-aminophenol-5-sulphonic acid-($\beta$-hydroxyethylamide), 6-methyl-2-aminophenol-4-sulphonic acid-($\beta$-hydroxyethylamide), 4-chloro-2-aminophenol-6-sulphonic acid-($\beta$-hydroxyethylamide), 4 - chloro-2-aminophenol-5-sulphonic acid-($\beta$-hydroxyethylamide), 4-methyl-2-aminophenol-5- or -6- sulphonic acid-($\beta$-hydroxyethylamide), 1-amino-2-hydroxynaphthalene-4-sulphonic acid - ($\beta$-hydroxyethylamide), dyestuffs of similar shades and dyeing properties are obtained.

*Example 12*

0.15 mol of diazotized 2-aminophenol are added at 0–5° C. to a soda-alkaline solution of 0.15 mol of a condensation product of 1 mol Ni-Pc-3-tetrasulphochloride, 1 mol 1-(3'- aminophenyl)-3-methyl-pyrazolone-5- and 3 mols aminoethyl hydrogen sulphate. After coupling is completed, the solution is rendered acid with acetic acid, 45 g. of sodium acetate are added and an aqueous solution of 20.4 g. of crystalline cobalt sulphate (.7 $H_2O$) is run in. The mixture is heated to 50° C. for 2 hours and filtered by suction after adding salt. A dyestuff thus obtained yields, when applied to cotton according to the instructions of Examples 2 and 3, olive-green dyeings and prints.

*Example 13*

1 mol Ni-Pc-3-tetrasulphonic chloride is introduced, while cooling with ice, into a methanolic suspension of 2 mols of an azo dyestuff from diazotized 6-chloro-2-aminophenol-4-sulphonyl - aminoethyl hydrogensulphate and 1-(4'-aminophenyl)-3-methyl-pyrazolone-5, 2 mols 3-aminobenzene-1-sulphonyl-aminoethyl hydrogensulphate and 450 g. of sodium bicarbonate. The mixture is then heated within 4 hours to 45° C., maintained at this temperature for 4 hours and filtered with suction. A green dyestuff is obtained which can be applied to cotton and spun rayon according to the methods of Examples 2 and 3. The dyeing is cobalted with an aqueous solution of cobalt sulphate in the presence of sodium acetate. The olive-green dyeings obtained show a very good fastness to light and washing.

*Example 14*

(a) 1 mol Ni-Pc-3-trisulphochloride is introduced at 15–20° C. into a suspension of 1 mol of a monoazo dyestuff from diazotized 2-aminophenol-4-sulphonic acid-(β - hydroxyethylamide) and 1 - (3'-aminophenyl) - 3-methyl-pyrazolone-5, 120 g. of ethanolamine and 450 g. sodium bicarbonate in 10 litres of methanol. The mixture is heated for 2 hours to 50° C., maintained at this temperature for 5 hours and filtered with suction while hot.

(b) 100 g. of a dry dyestuff prepared according to (a) are introduced at 15–25° C. in 300 ml. of sulphuric acid monohydrate. After stirring for 6 hours, the mixture is poured onto ice, the separated green dyestuff ester is filtered off with suction and is washed neutral with a 10% sodium chloride solution. The dyestuff can be cobalted according to the method of Example 1 in substance or on the fibre after application to cotton or regenerated cellulose. Olive-green dyeings, very fast to light, are obtained.

(c) A dyestuff obtained according to (a) is chromed according to Example 8(b) and subsequently esterified according to Example 8(c) with chlorosulphonic acid/pyridine. A blue-green dyestuff of valuable dyeing properties is thus obtained.

*Example 15*

50 g. of a disazo dyestuff from 2 mols diazotized 2-aminophenol-4,6-disulphonic acid and the condensation product of 1 mol Ni-Pc-3-disulphochloride and 2 mols 1-(4'-aminophenyl)-3 - methyl - pyrazolone-5 are introduced at 20–60° C. into 150 ml. of chlorosulphonic acid. The mixture is heated for 1 hour to 60–80° C., then 50 ml. of thionyl chloride are added dropwise and the mixture is after-stirred for 2 hours. After cooling the melt is put on ice and the dyestuff tetrasulphonic acid chloride is washed until neutral to Congo reaction with ice-water. The sulphochloride is introduced an ice-cold solution of 50 g. of aminoethyl hydrogensulphate in 400 ml. of water and 11 ml. of concentrated sodium hydroxide solution. By simultaneously adding dropwise a dilute solution of sodium hydroxide a pH of 9.5 is maintained. As soon as the pH is constant, sodium chloride is added and the dyestuff is pressed off. A dyestuff ester thus prepared can be cobalted in substance or on the fibre according to the methods described. On cotton the cobalt complex yields bluish olive-green dyeings, fast to boiling and solvents.

If in this example an equivalent quantity of 2-aminophenol is used instead of 2-aminophenol-4,6-disulphonic acid, a dyestuff disulphochloride is obtained which can be condensed in a similar manner with aminoethyl hydrogensulphate. An olive-green dyestuff of only slightly different shade is obtained.

If instead of aminoethyl hydrogen sulphate an equivalent quantity of ethanolamine is used, a dyestuff tetrasulphonic acid-(β-hydroxyethylamide) is obtained which can be chromed according to Example 8(b), and subsequently esterified with chlorosulphonic acid/pyridine according to Example 8(c). A dyestuff thus prepared can be applied according to Examples 2 and 3 to fibres containing hydroxyl groups, yielding a blue-green shade.

*Example 16*

4 mols of diazotized 2-aminophenol-4-sulphonylethyl hydrogensulphate are coupled according to Example 5 with 1 mol of a condensation product of 1 mol Ni-Pc-3-tetrasulphochloride and 4 mols 1-(4'-aminophenyl)-3-methyl-pyrazolone-5, and the tetrakis azo dyestuff is subsequently cobalted. A dyestuff thus prepared can be applied from an alkaline medium to cotton with an olive green coloration.

*Example 17*

1.45 mols 2-aminophenol-4-β-hydroxyethyl sulphone are coupled, according to the method of Example 8, with 0.72 mol of a condensation product of 1 mol Ni-Pc-3-disulphochloride and 2 mols 1-(4'-aminophenyl)-3-methyl-pyrazolone-5; the disazo dyestuff obtained is chromed according to Example 8(b) and subsequently esterified with chlorosulphonic acid/pyridine according to Example 8(c). A blue-green 1:2 chromium complex dyestuff is obtained.

*Example 18*

(a) In Example 8, instead of 6-chloro-2-aminophenol-4-sulphonic acid-(β-hydroxyethylamide) an equivalent quantity of the amine of the following formula is used:

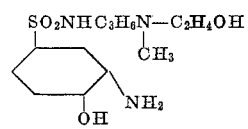

(b) The disazo dyestuff obtained is chromed according to Example 8(b) and esterified according to Example 9. A dyestuff ester is obtained which can be printed on cotton with blue green coloration.

*Example 19*

1/14 mole of a disazo dyestuff prepared according to Example 18(a) is cobalted according to the method of Example 9. The 1:2 cobalt complex obtained is subsequently esterified with chlorosulphonic acid/pyridine. The method can also be carried out in such a way that the o,o'-dihydroxy-disazo dyestuff is first esterified with sulphuric acid monohydrate according to Example 14(b) and the dyestuff ester subsequently metallised with cobalt sulphate in the presence of sodium acetate in an aqueous acetic acid solution. Such a dyestuff yields on cotton and regenerated cellulose olive-green dyeings fast to light and washing.

*Example 20*

(a) 0.125 mol of the disazo dyestuff N-3-aminobenzyl-N-methyl-N-β-hydroxyethylamine→1 mole condensation product of 1 mol Ni-Pc-3-disulphochloride and 2 mols 1-(4'-aminophenyl)-3-methyl-pyrazolone-5 is transformed into a green dyestuff ester according to Example 14b.

(b) The dyestuff thus prepared is stirred with 1000 ml. of water, adjusted to pH 5 with 50 ml. of glacial acetic acid and 75 g. of sodium acetate, and 68 g. crystalline copper sulphate in 250 ml. of water are added. Then 75 g. of 30% hydrogen peroxide in 500 ml. of water are added dropwise at 50° C. within one hour. The copper complex dyestuff formed is filtered off with suction after addition of salt and is dried at 50° C. The dyestuff can be padded or printed on cotton in the usual manner.

(c) A dry copper complex dyestuff obtained according to (b) is introduced at 15–25° C. in four times the quantity of sulphuric acid monohydrate. After about 3–4 hours the reaction mixture is put on ice, and the filter residue is washed neutral with a salt solution. The copper-free dyestuff ester can be applied to cotton from a soda-alkaline solution and cobalted on the fibre.

The dyestuff can also be cobalted in substance at 20–50° C. in an acetic acid or ammonia solution according to the methods described above, and can be applied according to Example 2 or 3 to materials containing hydroxyl groups. Olive-green dyeings of good general fastness properties are obtained.

*Example 21*

0.26 mol 6-chloro-2-aminophenol-4-sulphonyl-aminoethyl hydrogensulphate and 0.26 mol 1-aminobenzene-3-sulphonyl-aminoethyl hydrogensulphate are dissolved in 1.34 litres of ice/water (1:1) and 0.13 litre of concentrated hydrochloric acid and diazotized at 0° to 5° C. with 0.128 litre of a 30% sodium nitrate solution. 0.125 mol of the condensation product of 1 mol Ni-Pc-3-tetrasulphochloride and 4 mols 1-(4'-aminophenyl)-3-methyl-pyrazolone-5 are dissolved in 2.5 litres of water, 2.5 kg. of ice, 30 ml. concentrated sodium hydroxide solution and 50 g. sodium carbonate and mixed with the above diazotization solution. By simultaneously adding dropwise 60 ml. of concentrated sodium hydroxide solution a pH of about 10 is maintained. A clear dark green solution is formed. The solution is adjusted to pH 5 with about 85 ml. of glacial acetic acid. Then a solution of 46 g. crystalline cobalt sulphate (.7. $H_2O$) dissolved in 0.225 litre of hot water is run into the mixture which is kept, while stirring, at 50–60° C. for 1–2 hours. The free acetic acid is then buffered with about 45 ml. of concentrated sodium hydroxide solution, the 1:2 cobalt complex is salted out with 1 kg. of sodium chloride and pressed off. The dyestuff can be applied to cotton or regenerated cellulose according to the instructions of Examples 2 and 3. Green dyeings and prints with an olive shade and fast to washing are obtained, which, compared to those obtained with the dyestuff of Example 5, are distinctly clearer and greener.

*Example 22*

0.13 mol 6-chloro-2-aminophenol-4-sulphonyl-aminoethyl hydrogensulphate and 0.39 mol 1-aminobenzene-3-sulphonyl-aminoethyl-hydrogensulphate are dissolved in 1.34 litres of ice/water (1:1) and 0.13 litre of concentrated hydrochloric acid and diazotized with 0.128 litre of a 30% sodium nitrite solution at 0–5° C. 0.13 mol of the condensation product of 1 mol Ni-Pc-3-tetra-sulphochloride and 4 mols 1-(4'-aminophenyl)-3-methyl-pyrazolone-5 are dissolved in 2.5 litres of water, 2.5 kg. of ice, 0.03 litre of concentrated sodium hydroxide solution and 0.05 kg. of sodium carbonate and mixed with the above diazotization solution. By simultaneously adding dropwise 0.06 litre of concentrated sodium hydroxide solution a pH of about 10 is maintained. A clear dark green solution is formed. The solution is adjusted to about pH 5 with about 85 ml. of glacial acetic acid. Then a solution of 23 g. of crystalline cobalt sulphate (.7 $H_2O$) dissolved in 0.1 litre of hot water is added and the mixture is maintained, with stirring, at 50–60° C. for 1–2 hours. The free acetic acid is then buffered with about 45 ml. of concentrated sodium hydroxide solution, the 1:2 cobalt complex is salted out with about 1 kg. of sodium chloride and pressed off. The dyestuff can be applied to cotton or regenerated cellulose according to the instructions of Examples 2 or 3. Green dyeings and prints fast to washing and with a slight olive shade are obtained which are even greener than those obtained with the dyestuff of Example 21.

*Example 23*

0.26 mol 6-chloro-2-aminophenol-4-sulphonyl-aminoethyl hydrogensulphate and 0.26 mol 1-amino-3-sulphonyl-aminoethyl hydrogensulphate are diazotized in the manner described in Example 21, then coupled with 0.13 mol of the condensation product of 1 mol Ni-Pc-3-tetra-sulphochloride and 4 mols 1-(3'-aminophenyl)-3-methyl-pyrazolone-5 according to Example 21, and cobalted. Green dyeings and prints with an olive shade and fast to washing are obtained.

If a mixture of the diazo compounds of 0.13 mol 6-chloro-2-aminophenol-4-sulphonyl-aminoethyl hydrogensulphate and 0.39 mol 1-amino-3-sulphonyl-aminoethyl hydrogensulphate is prepared according to the method described in Example 22, the mixture is then coupled with 0.13 mol of the condensation product of 1 mol Ni-Pc-3-tetra-sulphochloride and 4 mols 1-(3'-aminophenyl)-3-methyl-pyrazolone-5 and cobalted in the manner described, green dyeings and prints with a slight olive shade are obtained.

*Example 24*

0.26 mol 6-chloro-2-aminophenol-4-sulphonyl-aminoethyl hydrogensulphate and 0.26 mol 1-amino-2-methoxy-benzene-5-sulphonyl-aminoethyl hydrogensulphate are diazotized, coupled with (a) 0.13 mol of the condensation product of 1 mol Ni-Pc-3-tetra-sulphochloride and 4 mols 1 - (4' - amino phenyl)-3-methyl-pyrazolone-5, or (b) 0.13 mol of the condensation product of 1 mol Ni-Pc-3-tetra-sulphochloride and 4 mols 1-(3'-aminophenyl)-3-methyl-pyrazolone-5 and cobalted in the manner described in Example 21. Green dyeings and prints with an olive shade and fast to washing are obtained.

*Example 25*

0.14 mol 6-chloro-2-aminophenol-4-sulphonyl-aminoethyl-hydrogensulphate and 0.39 mol 1-amino-2-methoxy-benzene-5-sulphonyl-aminoethyl hydrogensulphate are diazotized and coupled with (a) 0.13 mol of the condensation product of 1 mol Ni-Pc-3-tetra-sulphochloride and 4 mols 1-(4'-amino phenyl)-3-methyl-pyrazolone-5 or (b) 0.13 mol of the condensation product of 1 mol Ni-Pc-3-tetra-sulphochloride and 4 mols 1-(3'-aminophenyl)-3-methyl-pyrazolone-5 and cobalted in the manner described in Example 22. Dyeings and prints with only a slight olive shade and fast to washing are obtained.

*Example 26*

0.53 mol of 6-chloro-2-aminophenol-4-sulphonyl-aminoethyl hydrogensulphate are diazotized in the manner described in Example 5, coupled with 0.18 mol of the condensation product of 1 mol Ni-Pc-3-trisulphochloride and 3 mols acetoacetic acid-(2-methoxy-4'-amino-5'-chloro-phenyl)-amide and cobalted analogously to Example 5. On cotton and regenerated cellulose dyeings and prints of an olive green shade fast to washing and boiling are obtained.

*Example 27*

0.53 mol 6-chloro-2-aminophenol-4-sulphonyl-aminoethyl hydrogensulphate are diazotized in the manner described in Example 5, coupled with 0.18 mol of the condensation product of 1 mol Cu-PC-3-tri-sulphochloride and 3 mols 3'-aminobenzoyl-acetic acid anilide and cobalted analogously to Example 5. On cotton and regenerated cellulose prints and dyeings of an olive green shade fast to washing and boiling are obtained.

We claim:

1. Dyestuffs selected from the class consisting of the chromium and cobalt complex compound of an azo dyestuff of the formula

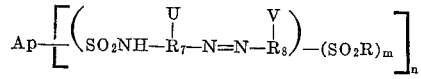

wherein Ap stands for the residue of an azaporphine dyestuff selected from the class consisting of copper phthalocyanine and nickel phthalocyanine; $R_7$ is a radical of the 1-aryl pyrazole series wherein U is a member selected from the group consisting of —OH, and —$NH_2$ in adjacent position to the azo bridge; $R_8$ is a diazo component selected from the class consisting of the benzene and naphthalene series; V is a metal-complex-forming group in ortho position to the azo bridge; R is a member selected from the class consisting of

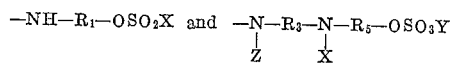

wherein $R_1$ stands for alkylene group having 2–3 carbon atoms between —N— and —O—; $R_3$ stands for lower alkylene; $R_5$ stands for alkylene group having 2 to 3 carbon atoms; Z is a member selected from the group consisting of hydrogen and lower alkyl; Y stands for a member selected from the class consisting of hydrogen and lower alkyl; X is a member selected from the group consisting of hydrogen and alkali metal cation; m stands for a member ranging from 1–2; and n is a number ranging from 1–8.

2. A dyestuff selected from the class consisting of the chromium and cobalt complex compound of a monoazo dyestuff corresponding to the formula

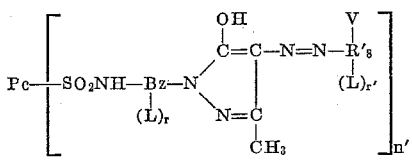

wherein Pc stands for nickel phthalocyanine; Bz is phenyl; $R'_8$ stands for the residue of a diazo compound of the benzene series having V in o-position to the azo bridge; V standing for a member selected from the group consisting of —OH and —COOH; $n'$ is an integer of 2–4; $r$ and $r'$ are intergers of 1–2, $r$ and $r'$ in combination being at least 1; and L stands for a member which in the free acid state has the formula

3. The 1:2 cobalt complex of the azo dyestuff which in the free acid state corresponds to the formula

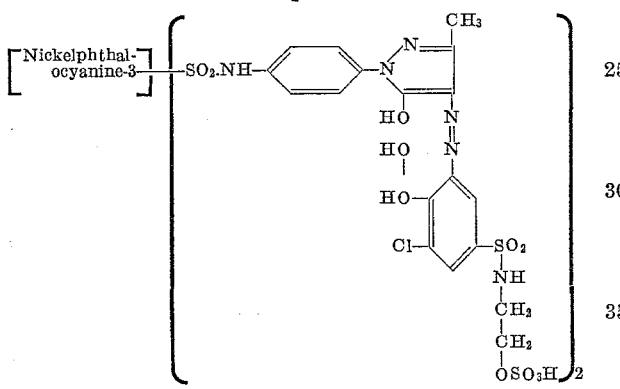

4. The 1:2 chromium complex of the azo dyestuff which in the free acid state corresponds to the formula

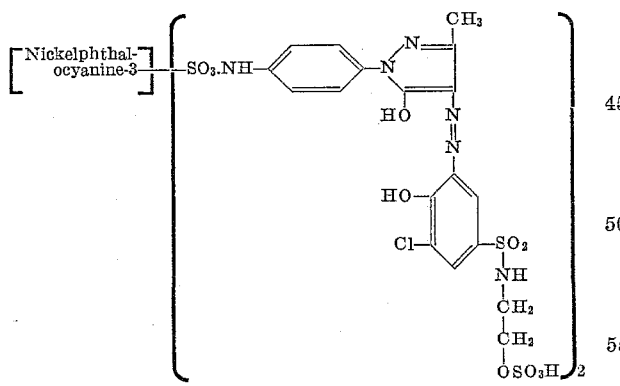

5. The 1:2 cobalt complex of the azo dyestuff which in the free acid state corresponds to the formula

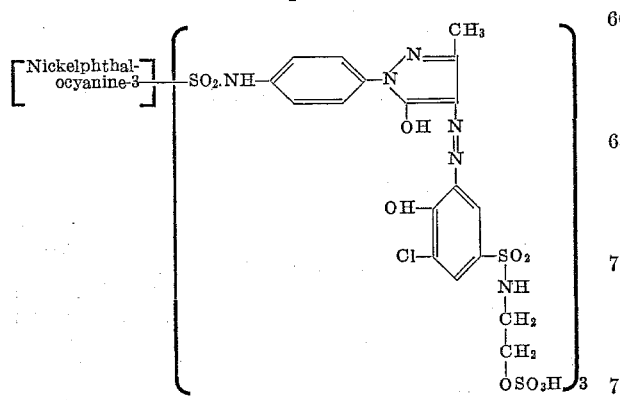

6. The 1:2 chromium complex of the azo dyestuff which in the free acid state corresponds to the formula

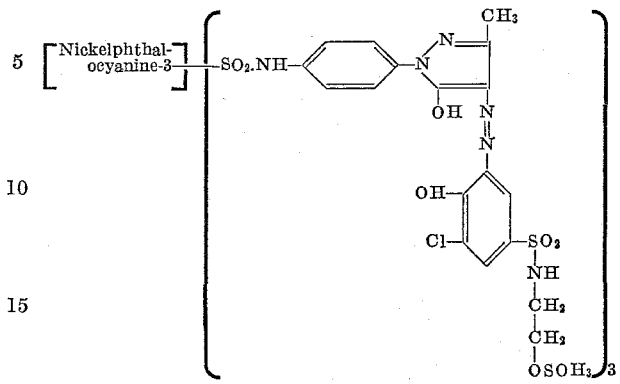

7. The 1:2 cobalt complex of the azo dyestuff which in the free acid state corresponds to the formula

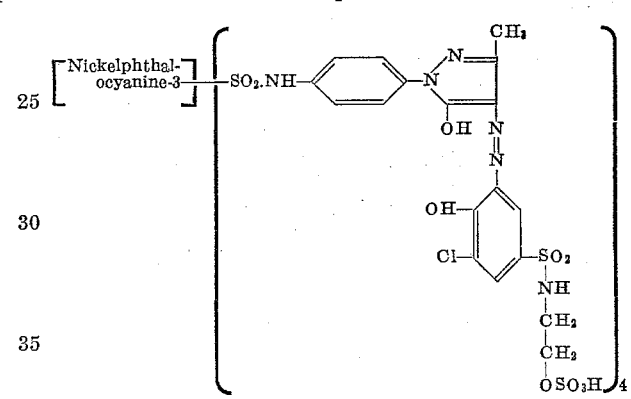

8. The 1:2 chromium complex of the azo dyestuff which in the free acid state corresponds to the formula

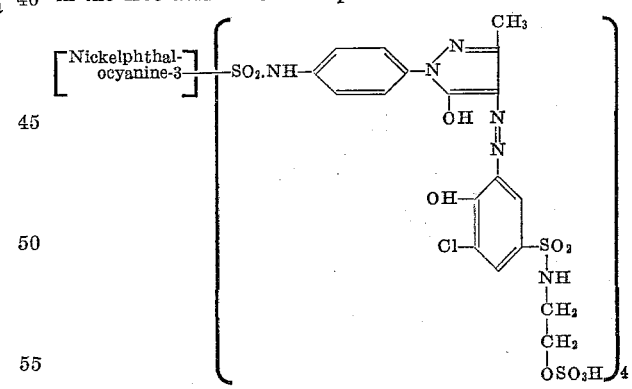

9. The 1:2 cobalt complex of the azo dyestuff which in the free acid state corresponds to the formula

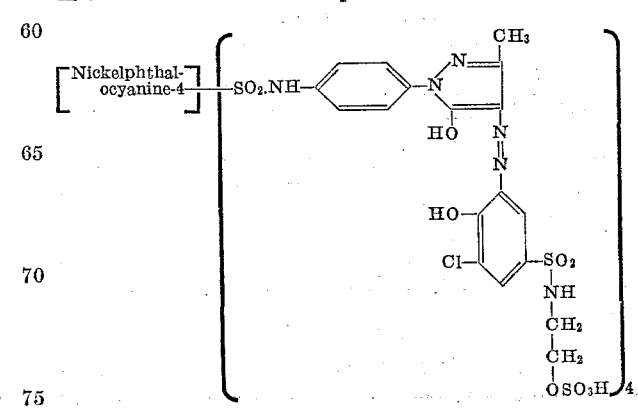

10. The 1:2 chromium complex of the azo dyestuff which in the free acid state corresponds to the formula

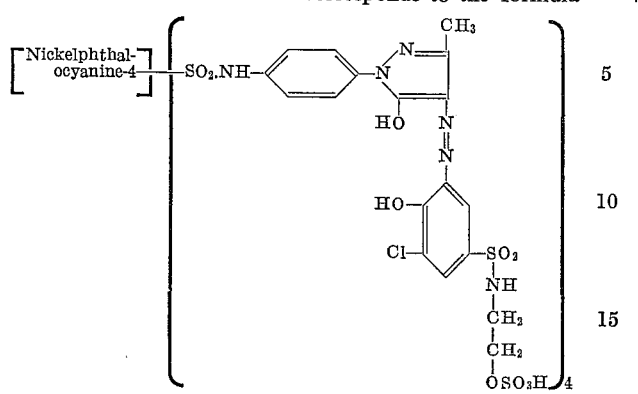

11. The 1:2 cobalt complex of the azo dyestuff which in the free acid state corresponds to the formula

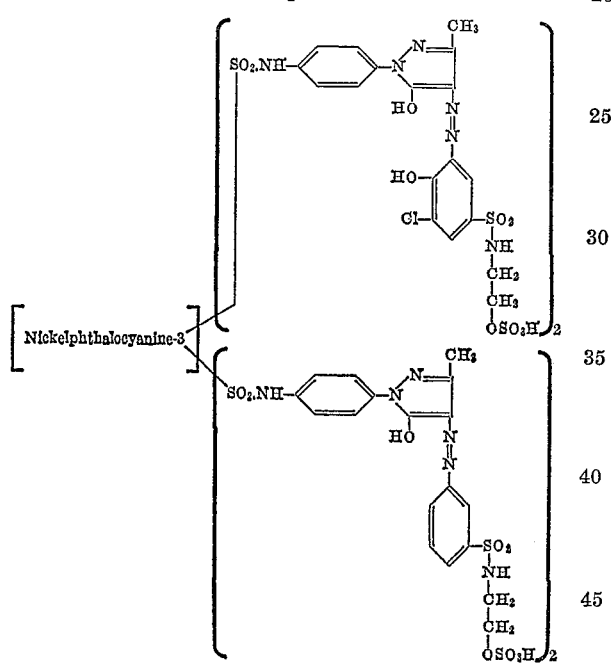

12. The 1:2 chromium complex of the azo dyestuff which in the free acid state corresponds to the formula

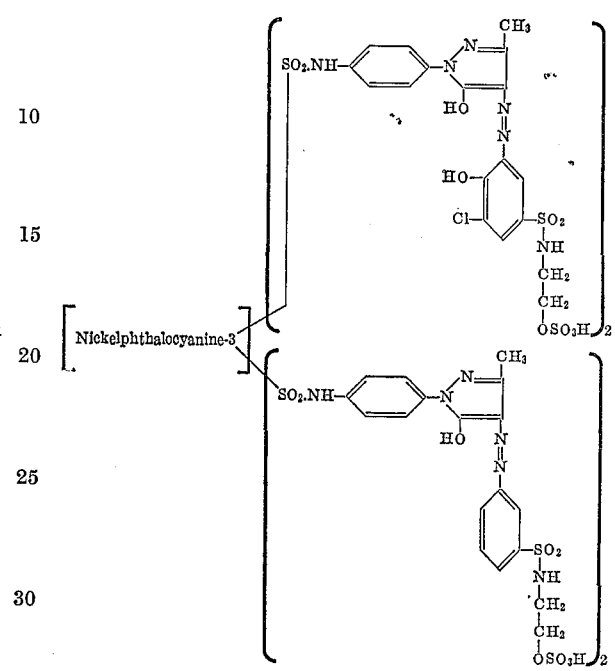

References Cited by the Examiner
UNITED STATES PATENTS
3,013,006  12/1961  Bienert et al. _____ 260—147

FOREIGN PATENTS
1,256,707  2/1961  France.

CHARLES B. PARKER, *Primary Examiner.*